Patented Nov. 1, 1932

1,885,221

UNITED STATES PATENT OFFICE

EDMOND JOHNSON BOAKE AND LEONARD WILLIAM ERNEST TOWNSEND, OF STRATFORD, LONDON, ENGLAND, ASSIGNORS TO A. BOAKE, ROBERTS AND COMPANY LIMITED, OF LONDON, ENGLAND, A BRITISH JOINT-STOCK COMPANY

CONDUCT OF EXOTHERMIC ACETALDEHYDE CONDENSATION REACTIONS

No Drawing. Application filed March 23, 1931, Serial No. 524,752, and in Great Britain March 29, 1930.

The present invention is for improvements in and relating to the conduct of exothermic organic reactions in the presence of water and has particular reference to the conduct of condensation reactions of pronounced exothermic character, such, for example, as the condensation of acetaldehyde, to β hydroxybutyraldehyde (acetaldol).

In the acetaldol and like condensations, it has been found that alkaline catalysts may be employed in one of two main methods which, although not intrinsically different, are nevertheless sufficiently distinctive to call for mention for the better explanation of the present invention. The two methods differ in the quantity of available catalyst employed. In general, the amount of available catalyst is determined by the nature of the catalyst itself, and by the temperature and velocity of the reaction. A point of considerable importance is the pronounced exothermic nature of some of these condensations, a consequence of which is that the reaction is liable to proceed with explosive violence.

If sufficiently small quantities of condensing agent or catalyst are used, the possibility of the reaction becoming violent is minimized. The catalyst in this case is usually employed in the dissolved condition with little, if any, additional or available catalyst in suspension. To this mode of operation, however, there are two main disadvantages. In the first place, the small quantities of acid which are almost invariably present in oxidizable substances such as aldehydes, especially acetaldehyde are sufficient to reduce the concentration of the catalyst to a marked degree, and since it is essential to maintain the catalyst concentration within certain limits for the reaction to proceed at both a practicable and safe rate skilled attention is required. Secondly, in many instances where small quantities of catalyst are employed, the reaction tends to be very slow, and if, to avoid this disadvantage, heat be applied, undesirable by-products as, for example, aldehyde resins, are liable to be produced.

If a large excess of available catalyst be employed to promote these condensations, the method has the advantage that the concentration of the catalyst is unaffected by the presence of small quantities of acid in the reacting substances. In this case, most of the catalyst is present in the solid state. In order, however, that the reaction may proceed with a measurable velocity, it is necessary that a certain small proportion of catalyst be present in the dissolved state in the reaction mixture, the amount so dissolved being dependent upon the nature of the catalyst itself, the temperature, and the velocity of reaction. In this case also, it is essential to ensure that the amount of dissolved catalyst does not attain such a concentration as will promote a violent reaction, and consequently the amount of water present must be carefully controlled. In general, provision is made for the efficient cooling of the reaction mixture in those cases where a large excess of active and available catalyst is present; and the cooling has hitherto been effected by carrying out the process in vessels provided with a jacket through which, as required, a cooling fluid may be passed. The difficulty of successfully operating this method naturally increases with increase in the bulk of the reaction mixture.

The present invention aims at providing an improved method of effecting exothermic organic reactions of the character of the acetaldol condensation, whereby the reaction may be conducted at a practicable speed with reduced risk both of overheating and of the production of undesirable by-products.

According to the present invention, a process of conducting exothermic organic reactions of the type described is characterized in this that the heat of the condensation reaction is controlled by the endothermic dehydration in the reaction-sphere of an hydrated salt present in the solid state and in quantity sufficient to provide for the requisite concentration of water in the reaction-sphere for dissolution of an adequate amount of catalyst to effect a practicable speed of reaction.

The said necessary concentration of water may be provided by the dehydration of a single hydrated salt or of a mixture of hydrated salts. Such hydrated salt or mixture of hydrated salts may comprise or contain the catalyst for the condensation reaction itself or may be an inert substance in so far as the promotion of the condensation is concerned and be employed with another substance or mixture of substances acting as the catalyst. The catalyst itself may be hydrated or unhydrated. Hydrated, preferably highly hydrated, sodium carbonate, for instance, the decahydrate, is an example of an hydrated salt which may be used to fulfil both the functions of supplying water to the reaction-sphere and of acting as the catalyst. Similarly, the decahydrate of sodium sulphate is an example of an inert hydrated salt which may be used in conjunction with a catalyst. When hydrated salts are used which are in themselves entirely or substantially entirely ineffective as condensing agents, it is necessary to add just sufficient catalyst, in the solid state or other concentrated form, for example, in strong aqueous solution, to catalyze the reaction. Generally speaking, any catalyst known to be suitable for the condensation of acetaldehyde can well be used in the present process to carry out the basic principle, which is, as pointed out above, the action, in the reaction-mass, of hydrated salts to produce internal cooling of the mass by virtue of endothermic dehydration.

The invention therefore embodies a particular method of cooling, whereby heat is withdrawn from the reaction-sphere internally, use being made of the affinity of the reactant for water. There is thus a dual control of the temperature; that arising from the endothermic dehydration and that from the particular method of regularly supplying a restricted amount of water to the reaction mass. Hydrated condensing agents or hydrated inert salts (that is to say, salts non-promotive of the condensation reaction itself) in association with small quantities of condensing agents proper, are employed in the solid state, preferably in a uniform state of division, and in sufficient quantity according to their degree of hydration to allow on dehydration for enough water for an adequate dissolution of the condensing agents themselves. By "adequate dissolution" is meant that sufficient water of dehydration must be withdrawn from the hydrated condensing agent or inert salt to allow the catalyst to dissolve in sufficient amount to give a practicable speed of reaction and degree of chemical conversion. Hence it will be appreciated that other conditions being alike the use of a lower hydrate will in general necessitate the use of a higher proportion. The negative heats of dehydration and solution oppose the positive heat of the condensation reaction; and hence by a suitable choice of hydrated salt the two heats may be so proportioned or balanced that the amount of external cooling adopted may be rather a matter of economy than of necessity, no risk attaching to the operation. The degree of self-cooling is highest when the reaction velocity is greatest, and so the conditions provide for a continuous proportioning or balancing of heat. When the concentration of the original reagents, for example, two molecules of aldehyde, is highest, the extent of dehydration is highest; and as the concentration of the reagent diminishes with the formation of the condensation product, the dehydration diminishes and, indeed, in certain cases in which the condensation product has a low affinity for water, hydration may commence so that the amount of water finally present in the form of hydrate differs but little from the amount originally present. In cases where the condensation product has such a low affinity for water that hydration commences before the reaction has proceeded sufficiently, water or an aqueous solution of the catalyst may be added in requisite quantity to increase the reaction speed, such operation being attended by no risk at this stage of the process.

It has further been found that a quantity of hydrated salt may be satisfactorily employed which is smaller than that required for a theoretical heat balance, some external cooling being applied in order to maintain the reaction mixture within the desired temperature limits. The minimum quantity of hydrated salt which is necessary for any particular condensation is dependent upon the nature and amount of the primary reacting substance or substances. If the hydrated salt is not a catalyst for the reaction then the minimum quantity necessary will also be influenced by the type of catalyst employed.

The total quantity of hydrated salt present, however, must of necessity lie above a certain limit in order that the reaction may proceed in a practical and satisfactory way. If too little salt be present, dehydration will proceed almost to completion without providing the requisite concentration of water in the reaction-sphere to allow of sufficient catalyst to be dissolved properly to promote the reaction.

The temperature at which the reaction may be carried out according to the invention may be varied through a moderately wide range, but in the case of the acetaldehyde condensation it should not exceed substantially 20°–25° C. and is preferably kept at approximately 10°–20° C.

*Example I*

To 100 parts of powdered sodium carbonate decahydrate $Na_2CO_3, 10 H_2O$, 100 parts of pure acetaldehyde are added and the mixture is stirred at 10° C. for four hours. The mass is then filtered under reduced pressure. By this means small amounts of unchanged acetaldehyde are withdrawn and may be recovered by cooling the pump-outlet gases. The aldol obtained contains some water and a small amount of acetaldehyde which may be removed by warming to 50° C. under reduced pressure.

The sodium carbonate crystals may be either washed with an organic solvent to remove small quantities of aldol and unchanged acetaldehyde and then hydrated with a quantity of water sufficient to restore the original state of hydration, or may be directly hydrated for further use.

Example II

To a mixture of 500 parts of powdered sodium sulphate decahydrate and 1 part of anhydrous sodium carbonate, 1000 parts of pure acetaldehyde are added and the mixture stirred at 15–16° C. for four hours. The mass is then filtered as in the previous example, yielding a filtrate containing aldol of high purity, together with a small quantity of water.

The crystalline residual mass may be washed free from aldol and acetaldehyde with an organic solvent and then hydrated and neutralised with sulphuric acid, or may, without washing, be directly hydrated and neutralised to give an hydrated material ready for further use with fresh catalyst. Alternatively, hydration without neutralization may serve to give a restored catalytic mass directly.

Another and, for many purposes, preferred method especially for large scale working, consists in mixing the substantially dry aldehyde with an inert hydrated salt, and then adding to the mixture a strong solution of the catalyst, for example, of a strength somewhat short of saturation at the temperature of the operation, the amount of water so introduced being insufficient itself to supply the total quantity necessary for the conduct of the reaction. The following is an example of this mode of procedure.

Example III

The reaction is carried out in an apparatus which comprises a reaction vessel fitted with an air-tight stirrer, a reflux condenser and arrangements for introducing separately known quantities of sodium sulphate crystals, pure acetaldehyde and the catalyst. A thermometer is fitted in a pocket on the vessel for indicating the temperature of the reacting substances and the vessel is immersed in a cooling bath through which a slow flow of cooling water can be passed. 300 parts by weight of neutral crystalline sodium sulphate decahydrate, of crystal size less than 10 mesh, are introduced into the reaction vessel and the air present is then displaced with nitrogen. 1000 parts by weight of pure acid-free acetaldehyde are then run into the reaction vessel and the stirring is commenced. Immediately after the introduction of the acetaldehyde the first quantity of catalyst is added. This is made up by dissolving 9.0 parts by weight of crystalline sodium carbonate decahydrate in 11.0 parts by weight of water, the solution being cooled to the temperature of the bath. The addition of this solution is made expediently and without loss. The sodium carbonate in the catalyst solution becomes endothermically precipitated in a fine form as the solution is added to the acetaldehyde and is not able to become redissolved to catalyze the reaction until the water content of the acetaldehyde has sufficiently increased by virtue of the dehyration of the sodium sulphate crystals. During the reaction precautions are taken to ensure the continued absence of air by passing into the reaction vessel a slow current of nitrogen which emerges from the condenser. After a period of approximately half an hour from the first addition of catalyst a second addition is made, the quantity of sodium carbonate crystals being of the same weight and in the same dissolved form as before. In this first half an hour the temperature of the reagents has risen from 11° C. to 15° C. In the course of the next hour the temperature gradually rises to 17° C. At the end of this time a third quantity of catalyst is added, made up exactly as before. The temperature of the reagents then proceeds to rise slowly to 19° C. in the course of the following hour, after which a fourth and final addition of the same quantity of catalyst in the same form is made. The reagents are then kept stirred for an additional period of one and a half hours, the final temperature being 22° C. During the first part of the reaction the temperature of the cooling water is maintained at 12° C. to 15° C. by maintaining a comparatively slow flow through the bath. After a period of two and a half hours from the start the flow is reduced, so that at the end of the reaction, i. e., after a period of four hours, its temperature is 19° C.

In the initial stages of the reaction the temperature of the reagent is inclined to fall slightly below that of the cooling bath, indicating that the cooling effect due to dehydration of the crystals is slightly greater at this period than the heating effect due to the condensation itself. After the period of four hours the reagents are dissolved completely in water and the solution is neutralised with dilute sulphuric acid. The solution is found to contain 800 parts by weight of aldol, representing a conversion of 80% of the theoretical.

The methods of separation of the aldol from unchanged aldehyde may be those usually employed in condensations of the aforesaid character. Preliminary distillation of the main products prior to their further use is, in general, unnecessary. Direct filtration, with or without the use of solvents, followed by the recovery of any unchanged primary reagent both in the filtrate and in the partially dehydrated salt, together with proper treatment of the latter to restore it to the original state of hydration, may form the general procedure of working up the products. From the product, small quantities of catalyst, water and neutral salts, if present, may be precipitated, as need be, by the addition of an organic solvent. Alternatively, dehydration of the reaction-product may be carried out whereby dissolved water-soluble salts are precipitated; or a neutral solution of the reaction-product containing unchanged primary material may be obtained by dissolving completely in water and neutralising the solution.

The invention may be applied to the condensation of aldehyde to paraldehyde, crystalline sodium bisulphate being a suitable catalyst for this purpose. One method of procedure is to add three parts by weight of the freshly prepared catalyst to 1000 parts of gently agitated acetaldehyde with sufficient cooling to prevent loss. At periods of approximately thirty minutes after the first addition of the catalyst, a further quantity of the same weight of the latter is added. At the end of one-and-a-half to two hours, the unchanged acetaldehyde is distilled off leaving a residue of pure paraldehyde which is readily separable from the catalyst, for example, by filtration. The conversion is about 90 to 95 per cent. of the theoretical.

This reaction may be carried out with more certain control of the temperature by incorporating with the catalyst a neutral salt which is endothermically dehydrated by the acetaldehyde and thus gives a partial heat balance in the early stages of the reaction, the following being an example of the way of proceeding:

Example IV 50 parts by weight of neutral crystalline sodium sulphate, $Na_2SO_4, 10H_2O$, are mixed with 8–10 parts by weight of freshly prepared crystalline sodium hydrogen sulphate and the mixture added to 1000 parts of acetaldehyde in a vessel fitted with a stirrer, reflux condenser and water jacket. The reaction commences immediately and with a mild temperature increase. The reactants are kept gently stirred and at a temperature between 12° C. and 18° C. At periods of 30 minutes from the commencement of the reaction further quantities of the catalyst are added, each of 8–10 parts by weight. These additions are made in order to maintain the reaction velocity at a practicable and approximately uniform rate. Paraldehyde is formed. As the concentration of the paraldehyde increases the reaction velocity decreases, so that it is unnecessary to add any further quantity of the neutral salt. After a period of 2–3 hours the unchanged acetaldehyde is distilled off and the salts removed by filtration. The weight of paraldehyde so obtained amounts to approximately 80 per cent. of the theoretical.

We claim:—

1. The improvement in the process for the condensation of acetaldehyde in the presence of an alkaline condensation catalyst and water, comprising the step of forming the water for the reaction in situ in the reaction sphere, and coincidentally controlling the reaction temperature, by causing the acetaldehyde to endothermically dehydrate an alkali-metal, hydrated-salt, present in the reaction mass in the solid state.

2. The improvement in the process for the condensation of acetaldehyde in the presence of an alkaline condensation catalyst and water, comprising the step of forming the water for the reaction in situ in the reaction sphere and coincidentally controlling the reaction temperature by causing the acetaldehyde to endothermically dehydrate an alkali-metal, hydrated-salt present in the reaction mass in the solid state, said salt itself constituting the catalyst for the reaction.

3. The improvement in the process for the condensation of acetaldehyde in the presence of an alkaline condensation catalyst and water, comprising the step of forming water for the reaction in situ in the reaction sphere and coincidentally controlling the reaction temperature by causing the acetaldehyde to endothermically dehydrate an inert, alkali-metal, hydrated-salt present in the reaction mass in the solid state and additional to the catalyst therein.

4. The improvement in the process for the condensation of acetaldehyde in the presence of an alkali-metal salt condensation catalyst and water, comprising the step of forming the water for the reaction in situ in the reaction sphere and coincidentally controlling the reaction temperature by causing the acetaldehyde to endothermically dehydrate a neutral, hydrated-salt of an alkali-metal, present in the reaction mass in the solid state in addition to the catalyst therein.

5. The improvement in the process for the production of acetaldol by the condensation of acetaldehyde in the presence of a catalyst and water, comprising applying the catalyst in the form of an hydrated, alkaline salt of an alkali-metal, said catalyst being present in the reaction mass in quantity sufficient to provide, in situ in the reaction sphere, by endothermic dehydration by the acetaldehyde, the necessary water for the reaction and to balance the heat of reaction.

6. The improvement in the process for the production of acetaldol by the condensation of acetaldehyde in the presence of an alkaline condensation catalyst and water, comprising forming the water for the reaction in situ in the reaction sphere and coincidentally controlling the reaction temperature by causing the acetaldehyde to endothermically dehydrate an alkali-metal, hydrated salt present in the reaction mass in the solid state.

7. The improvement in the process for the production of acetaldol by the condensation of acetaldehyde in the presence of an alkali-metal salt condensation catalyst and water, comprising the step of forming the water for the reaction in situ in the reaction sphere and coincidentally controlling the reaction temperature by causing the acetaldehyde to endothermically dehydrate an hydrated, inert, alkali-metal salt present in the reaction mass in the solid state.

8. The improvement in the process for the production of acetaldol by the condensation of acetaldehyde in the presence of an alkaline condensation catalyst and water, comprising the step of forming the water for the reaction in situ in the reaction sphere, and coincidentally controlling the reaction temperature by causing the acetaldehyde to endothermically dehydrate a neutral, hydrated salt of an alkali-metal present in the reaction mass in the solid state and additional to the catalyst therein.

9. A process for the production of acetaldol by the condensation of acetaldehyde in the presence of a catalyst and water, in which the catalyst consists of hydrated sodium carbonate present in the reaction mass in the solid state and in quantity sufficient to provide in situ in the reaction sphere, by the endothermic dehydration by the acetaldehyde, the necessary water for the reaction and to balance the heat of reaction.

10. The improvement in the process for the production of acetaldol by the condensation of acetaldehyde in the presence of an alkali-metal salt condensation catalyst and water, comprising the step of forming the water for the reaction in situ in the reaction sphere, and coincidentally controlling the reaction temperature by causing the acetaldehyde to endothermically dehydrate a hydrated sodium sulphate present in the reaction mass in the solid state.

11. A process for the production of acetaldol by the condensation of acetaldehyde in the presence of a catalyst and water, in which the catalyst consists of sodium carbonate and the water for the reaction is formed in situ in the reaction sphere and at the same time the reaction temperature is controlled, by the endothermic dehydration by the acetaldehyde of hydrated sodium sulphate present in the reaction mass in the solid state.

12. A process for the production of acetaldol by the condensation of acetaldehyde in the presence of a catalyst and water, in which the catalyst consists of sodium carbonate and the water for the reaction is formed in situ in the reaction sphere and at the same time the reaction temperature is controlled, by the endothermic dehydration by the acetaldehyde of sodium sulphate decahydrate present in the reaction mass in the solid state.

13. A process for the production of acetaldol by the condensation of acetaldehyde in the presence of a catalyst and water, in which the catalyst consists of hydrated sodium carbonate and the additional water for the reaction is formed in situ in the reaction sphere and at the same time the reaction temperature is controlled, by the endothermic dehydration by the acetaldehyde of sodium sulphate decahydrate present in the reaction mass in the solid state.

14. A process for the condensation of acetaldehyde in the presence of a catalyst and water, in which the catalyst consists of crystalline sodium bisulphate and the water for the reaction is formed in situ in the reaction sphere and at the same time the reaction temperature is controlled, by the endothermic dehydration by the acetaldehyde of sodium sulphate decahydrate present in the reaction mass in the solid state.

15. A process for the production of acetaldol by the condensation of acetaldehyde in the presence of an alkaline condensation catalyst and water, which consists in agitating substantially pure acetaldehyde with a solid, neutral, hydrated salt of an alkali-metal, incorporating with the mixture in aqueous solution a part of the total quantity and progressively adding in aqeous solution the balance of the catalyst requisite for the completion of the reaction, the quantity of said neutral hydrated salt initially present in the reaction mass being sufficient to provide, by its progressive dehydration by the acetaldehyde, the necessary water for the reaction to proceed to completion.

16. A process for the production of acetaldol by the condensation of acetaldehyde in the presence of a catalyst and water, which consists in agitating substantially pure acetaldehyde with sodium sulphate decahydrate, incorporating with the mixture in aqueous solution a part of the total quantity of catalyst required for the reaction, said catalyst consisting of sodium carbonate, continuing the agitation and progressively adding in aqueous solution the balance of the sodium carbonate requisite for the completion of the reaction, the quantity of sodium sulphate decahydrate initially present in the reaction mass being sufficient to provide, by its progresive dehydration by the acetaldehyde, the necessary water for the reaction to proceed to completion.

17. A process of condensing acetaldehyde to acetaldol which consists in mixing about 300 parts of substantially pure acetaldehyde with about 90 parts of crystalline sodium sulphate decahydrate, adding to the mixture under agitation about 1 part of anhydrous sodium carbonate in solution in 5 parts of water, continuing the agitation while maintaining a substantially normal room temperature, and adding further like quantities of the sodium carbonate in solution from time to time until the reaction is finished.

18. A process of conducting exothermic acetaldehyde condensation reactions in the presence of water, which comprises controlling the heat of the reaction by the endothermic dehydration in the reaction-sphere of a hydrated saline alkaline-condensation catalytic mass whereof an alkali-metal hydrated-salt is present in the solid state in quantity sufficient to ensure a concentration of water in the reaction-sphere which is requisite for the dissolution of an adequate amount of catalyst to effect a practicable speed of reaction but in smaller quantity than is required for a theoretical heat-balance, and externally cooling the reaction to the degree required to maintain the reaction mixture within the desired temperature limits.

19. A process of conducting exothermic acetaldehyde condensation reactions in the presence of water, which comprises, controlling the heat of the reaction by the endothermic dehydration in the reaction-sphere of a hydrated saline alkaline-condensation catalytic mass whereof an alkali-metal hydrated salt is present in the solid state in quantity sufficient to ensure a concentration of water in the reaction-sphere which is requisite for the dissolution of an adequate amount of catalyst to effect a practicable speed of reaction, and compensating for low affinity of the reaction-product for water, with consequent subsequent reduction in the water concentration derived from the hydrated salt, by the addition, at this stage of retardation, of water in adequate quantity to increase the speed of the reaction.

20. A process of conducting exothermic acetaldehyde condensation reactions in the presence of water, which comprises, controlling the heat of the reaction by the endothermic dehydration in the reaction-sphere of a hydrated saline alkaline-condensation catalytic mass whereof an alkali-metal hydrated salt is present in the solid state in quantity sufficient to ensure a concentration of water in the reaction sphere which is requisite for the dissolution of an adequate amount of catalyst to effect a practicable speed of reaction, and compensating for low affinity of the reaction-product for water, with consequent subsequent reduction in the water concentration derived from the hydrated salt, by the addition, at this stage of retardation, of an equeous solution of the catalyst in adequate quantity to increase the speed of the reaction.

EDMOND JOHNSON BOAKE.
LEONARD WILLIAM ERNEST TOWNSEND.